(12) United States Patent
Shih

(10) Patent No.: US 7,894,145 B2
(45) Date of Patent: Feb. 22, 2011

(54) LENS ADJUSTING DEVICE AND IMAGE TRACKING SYSTEM WITH THE SAME

(75) Inventor: Wei-Kuo Shih, Tu-Cheng (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 53 days.

(21) Appl. No.: 12/345,375

(22) Filed: Dec. 29, 2008

(65) Prior Publication Data
US 2009/0268314 A1 Oct. 29, 2009

(30) Foreign Application Priority Data
Apr. 28, 2008 (CN) .......................... 2008 1 0301364

(51) Int. Cl.
*G02B 7/02* (2006.01)
(52) U.S. Cl. ........................ 359/814; 359/824
(58) Field of Classification Search .................. 359/814
See application file for complete search history.

(56) References Cited
U.S. PATENT DOCUMENTS
2008/0080071 A1* 4/2008 Kawashiki ................... 359/822

2009/0115850 A1* 5/2009 Nakamura .................. 348/169

FOREIGN PATENT DOCUMENTS
CN     2689266 Y     3/2005
CN     1756306 A     4/2006

* cited by examiner

*Primary Examiner*—Jordan M. Schwartz
*Assistant Examiner*—James C Jones
(74) *Attorney, Agent, or Firm*—D. Austin Bonderer

(57) ABSTRACT

A lens adjusting device (100) includes an optical module (10) and a driver module (20). The driver module includes a seat (22), at least one magnet (24) and at least one winding (26). The optical module is rotatably fixed on the seat. The magnet is fixed on the optical module. The magnet and the winding are positioned at one side of the optical module. A variable current is applied to the winding, and a magnetic field is formed at ends of the winding. The magnetic forces between the magnetic field and the magnet drives the optical module to rotate.

15 Claims, 4 Drawing Sheets

LENS ADJUSTING DEVICE AND IMAGE TRACKING SYSTEM WITH THE SAME

BACKGROUND

1. Field of the Invention

The present invention generally relates to cameras and, particularly, to a lens adjusting device and an image tracking system with the lens adjusting device.

2. Description of Related Art

Cameras are widely used and have brought convenience to our lives. In short, cameras have become a part of modern life. Several cameras are used for electronic video communication. In video communication, seeing the face of the other user is important. However, most conventional cameras do not move automatically to track a user's face. The user has to specially move the camera by hand to re-enter the field of view, or has to consciously move his or her face back into the field of view of the camera.

Therefore, there is room for improvement within the art.

BRIEF DESCRIPTION OF THE DRAWINGS

Many aspects of the lens adjusting device can be better understood with reference to the following drawings. The components in the drawings are not necessarily drawn to scale, the emphasis instead being placed upon clearly illustrating the principles of the lens adjusting device. Moreover, in the drawings, like reference numerals designate corresponding parts throughout the several views, in which.

DETAILED DESCRIPTION OF THE EMBODIMENTS

Figure 1:
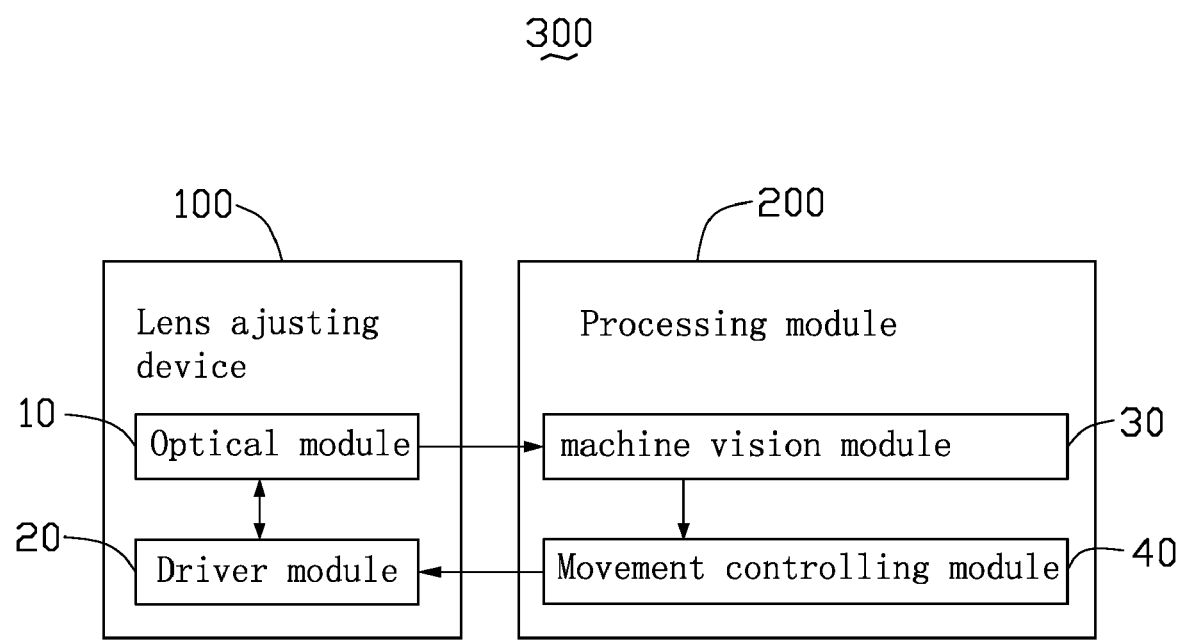
FIG. 1 is a block diagram of an image tracking system including a lens adjusting device and a data processing module in an exemplary embodiment.

FIG. 1 shows a block diagram of an image tracking system 300 according to an exemplary embodiment. The image tracking system 300 includes a lens adjusting device 100 and a data processing module 200. The lens adjusting device 100 includes an optical module 10 and a driver module 20 that are physically connected to each other. The optical module 10 is used to capture images, and the driver module 20 is configured for rotating the optical module 10 to track an image object (e.g., face of a user).

The data processing module 200 processes the image data from the lens adjusting device 100 and controls the movement of the optical module 10. The data processing module 200 includes a machine vision module 30 and a movement controlling module 40 electronically connected to the lens adjusting device 100. The machine vision module 30 tracks the location of the image object according to the image data fed and received from the optical module 10. Also, the machine vision module 30 can compare the present location of the image object to the original location of the image object, calculating the displacement of the image object. The machine vision module 30 sends the data corresponding to the displacement of the image object to the movement controlling module 40, and then the movement controlling module 40 decides whether, and how much, to move the optical module 10.

The optical module 10, the driver module 20, the machine vision module 30 and the movement controlling module 40 work together, to track the image object. For example, when tracking a face of the user, the optical module 10 records image data of the left eye, the right eye and the nose of the user. The left eye, the right eye and the nose are considered as three points, and a triangle is formed when the three points are linked. The recorded data is then sent to the machine vision module 30. The machine vision module 30 receives the data from the optical module 10, and calculates the location of a center point of the triangle. When the face moves, the location of the center point of the triangle correspondingly moves. The machine vision module 30 calculates the displacement of the center point of the triangle and sends a signal indicative of the movement to the movement controlling module 40. The movement controlling module 40 calculates a rotation angle of the optical module 10 according to the movement of the object. The driver module 20 receives the instructions from the movement controlling module 40, and moves the optical module 10 to track the movement of the user (e.g. face the face of the user).

Figure 2:
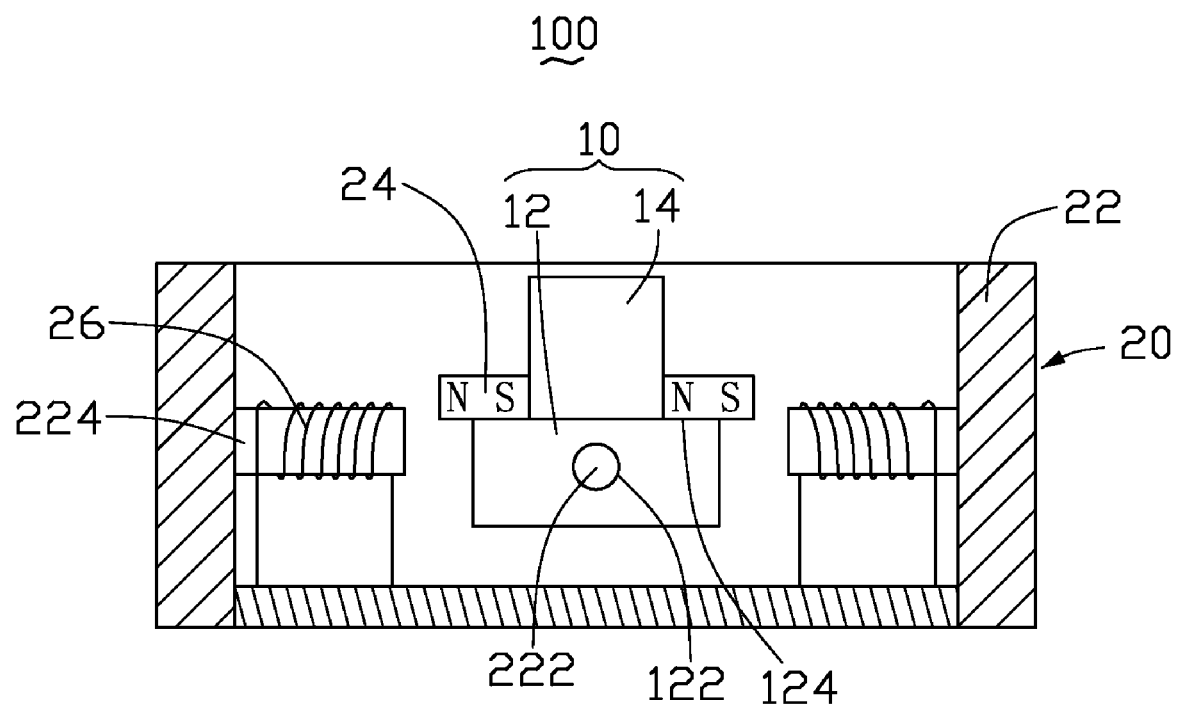
FIG. 2 is a schematic view of the lens adjusting device shown in FIG. 1.

FIG. 2 shows a schematic view of the lens adjusting device 100 including the optical module 10 and the driver module 20. The optical module 10 includes a base 12 and a lens 14. The base 12 and the lens 14 may be column-shaped. The lens 14 is typically mounted on a center area of a top surface 124 of the base 12 for rotational symmetry. The base 12 has a round hole 122 defined in a center portion thereof.

The driver module 20 includes a seat 22, two magnets 24 and two windings 26. The seat 22 is generally a box with an open end. A shaft 222 is formed on one sidewall of the seat 22, configured for matching with the round hole 122 of the base 12. The optical module 10 is rotatable relative to the shaft 222 of the seat 22 by engagement of the shaft 222 and the round hole 122. Two columns 224 respectively extend from opposite sidewalls of the seat 22, positioned at two sides of the optical module 10. An axis of each column 224 is substantially at a same height as the shaft 222, and is perpendicular to the longitudinal axis of the shaft 222. Each magnet 24 has a rectangular section, and is positioned on the top surface 124 of the base 12. The magnets 24 are respectively positioned at both sides of the lens 14. The windings 26 are respectively wrapped around the columns 224, connecting to a power source (not shown). When current is not flowing, the windings 26 are do not create a magnetic field, and the optical module 10 is in balanced position. When current is flowing, the windings 26 create a magnetic field, and the optical module 10 rotates in a certain angle according to the direction and strength of the magnetic fields created by the windings 26.

Figure 3:
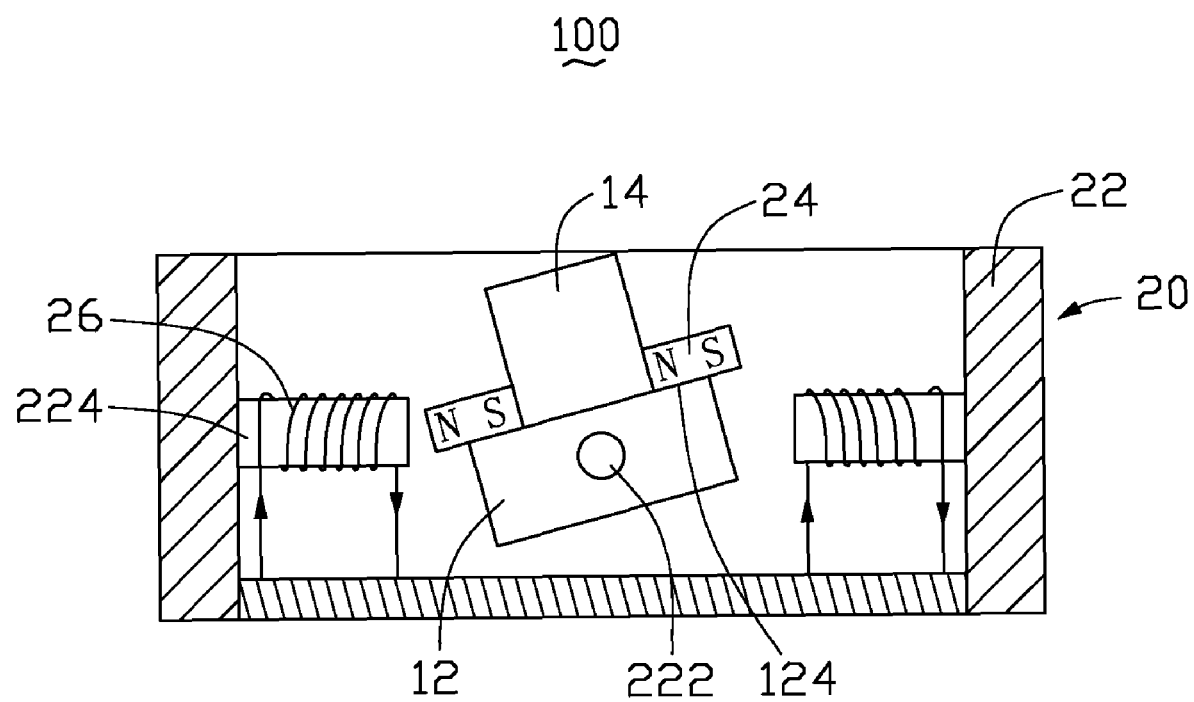
FIG. 3 is similar to FIG. 2, but showing the lens adjusting device at a first working position.

Referring to FIG. 3, When the image object moves left relative to the optical module 10, the machine vision module 30 sends a data of displacement of the image object to the movement controlling module 40. The movement controlling module 40 decides a rotation angle of the optical module 10 according to the displacement of the object. The driver module 20 receives the data from the movement controlling module 40, and controls the strength and direction of the current to the windings 26. A magnetic field is formed at one end of the winding 26. According to the "right-hand rule", the magnetic force of one end of the left winding 26 is opposite to that of an adjacent end of the left magnet 24, and the magnetic pole of one end of the right winding 26 is similar to an adjacent end of the right magnet 24. Like magnetic poles repel, unlike magnetic poles attract, the optical module 10 turns left in a certain angle, so as to track the object.

Figure 4:
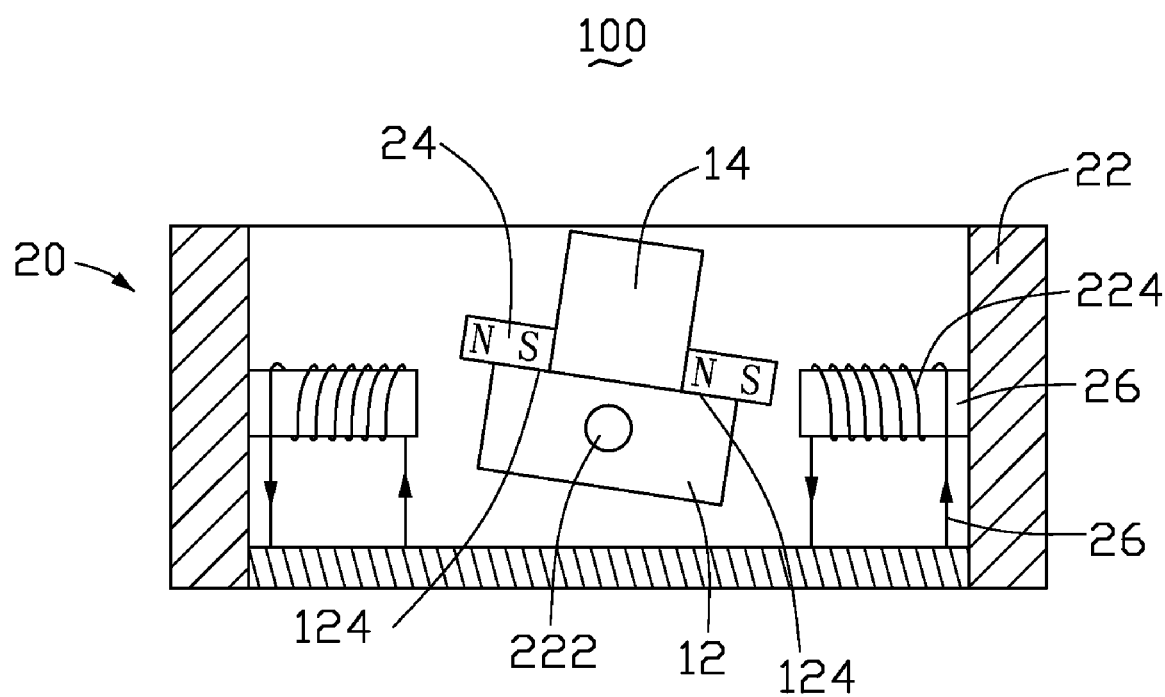
FIG. 4 is similar to FIG. 2, but showing the lens adjusting device at a second working position.

Referring to FIG. 4, when the object moves right relative to the optical module 10, the direction of the current of the windings 26 is opposite to above. The magnetism of one end of the right winding 26 is opposite to that of an adjacent end of the right magnet 24, and the magnetic pole of one end of the left winding 26 is similar to an adjacent end of the left magnet 24. The optical module 10 turns right to track the object.

It is to be understood that one magnet 24 and the corresponding winding 26 may be omitted. Also, the number of the magnetisms and the windings 26 may increase at the same time.

Image tracking system 300 may be used with the following method for capturing images, comprising: providing a rotatable optical module for capturing images; feeding image data to a data processing module; using the data processing module to determine whether the subject of the images has moved; using a driver module electronically connected to the data processing module and physically connected to the optical module for moving the optical module to track a moving subject.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A lens adjusting device comprising:
    an optical module;
    a driver module including a seat, at least one magnet and at least one winding, a shaft and at least one column extending from the seat, an axis of the at least one column being perpendicular to that of the shaft, the at least one winding mounted on the at least one column, the optical module being rotatable relative to the shaft, the at least one magnet being fixed on the optical module, the at least one magnet and the at least one winding being positioned at the same side of the optical module, whereby when a variable current is applied to the at least one winding, a magnetic field forms at ends of the at least one winding, magnetic forces between the magnetic field and the at least one magnet driving the optical module to rotate.

2. The lens adjusting device as claimed in claim 1, wherein the optical module comprises a base and a lens mounted on the base, the base has a round hole defined therein, and the shaft is engaged in the round hole.

3. The lens adjusting device as claimed in claim 2, wherein the at least one magnet is fixed on the base, facing the at least one winding.

4. The lens adjusting device as claimed in claim 3, wherein there are two magnets and two windings, the two magnets are positioned at two sides of the lens, and each winding corresponds to a magnet.

5. The lens adjusting device as claimed in claim 2, wherein the column is formed on one sidewall of the seat.

6. The lens adjusting device as claimed in claim 4, wherein there are two columns, and the two windings are respectively mounted on the columns.

7. An image tracking system comprising:
    a lens adjusting device including:
        an optical module for capturing images of an object; and
        a driver module including a seat, at least one magnet and at least one winding, the optical module being rotatably fixed to the seat, the magnet being fixed on the optical module, the magnet and the winding being positioned at same side of the optical module, whereby when a variable current is applied to the winding, a magnetic field forms at ends of the winding, the magnetic forces between the magnetic field and the magnet driving the optical module to rotate; and
    a data processing module including:
        a machine vision module receiving the image data from the optical module and calculating a displacement of the object; and
        a movement controlling module calculating a rotation angle of the optical module according to the displacement of the object, the driver module driving the optical module to rotate to track the object.

8. The lens adjusting device as claimed in claim 7, wherein the optical module comprises a base and a lens mounted on the base, the base has a round hole defined therein, a shaft is associated with the seat, and the optical module is rotatable relative to the shaft by engagement of the shaft and the round hole.

9. The lens adjusting device as claimed in claim 8, wherein the magnet is fixed on the base, facing the winding.

10. The lens adjusting device as claimed in claim 9, wherein there are two magnets and two windings, the two magnets are positioned at two sides of the lens, and each winding corresponds to a magnet.

11. The lens adjusting device as claimed in claim 8, wherein a column is formed on one sidewall of the seat, an axis of the column is perpendicular to that of the shaft, and the winding is mounted on the column.

12. The lens adjusting device as claimed in claim 10, wherein two columns are respectively formed on two sidewalls of the seat, an axis of each of the columns is perpendicular to that of the shaft, and the two winding are respectively mounted on the columns.

13. A lens adjusting device comprising:
    an optical module;
    a driver module including a seat, a plurality of magnets, a plurality of columns and a plurality of windings, each column extending from the seat, each winding mounted on a corresponding column, the optical module being rotatably fixed to the seat, the magnets being fixed on the optical module, the magnets facing the windings correspondingly, whereby when a variable current is applied to the at least one winding, a magnetic field forms at ends of the at least one winding, magnetic forces between the magnetic field and the at least one magnet driving the optical module to rotate.

14. The lens adjusting device as claimed in claim 13, wherein there are two magnets, two columns and two windings, the two magnets are positioned at two opposite sides of the lens.

15. The lens adjusting device as claimed in claim 14, wherein a shaft extends from the seat, the optical module is rotatable relative to the shaft, and an axis of each of the columns is perpendicular to that of the shaft.

* * * * *